United States Patent [19]
Ralston

[11] 3,905,146

[45] Sept. 16, 1975

[54] FLY SWATTER

[76] Inventor: Carleton H. Ralston, 2227 Maricopa Dr., Los Angeles, Calif. 90065

[22] Filed: Nov. 18, 1974

[21] Appl. No.: 524,597

[52] U.S. Cl. .................................................. 43/137
[51] Int. Cl.² .......................................... A01M 3/02
[58] Field of Search ............. 43/137; D22/20; D88/2

[56] References Cited
UNITED STATES PATENTS
1,055,998  3/1913  Allis et al. ............................ 43/137
3,412,501  11/1968  Rosen ................................... 43/137

Primary Examiner—G. E. McNeill
Assistant Examiner—Peter K. Skiff
Attorney, Agent, or Firm—Nilsson, Robbins, Bissell, Dalgarn & Berliner

[57] ABSTRACT

A compactable fly swatter is disclosed having a hollow tubular handle to receive a plurality of retractable arms or strikers. A slide mechanism is pivotally attached in off center fashion to each of the strikers for reciprocating the strikers outwardly into a fan-like structure and inwardly for alignment in the hollow handle. The device may be used for the desired purpose or placed into one's pocket as desired.

7 Claims, 5 Drawing Figures

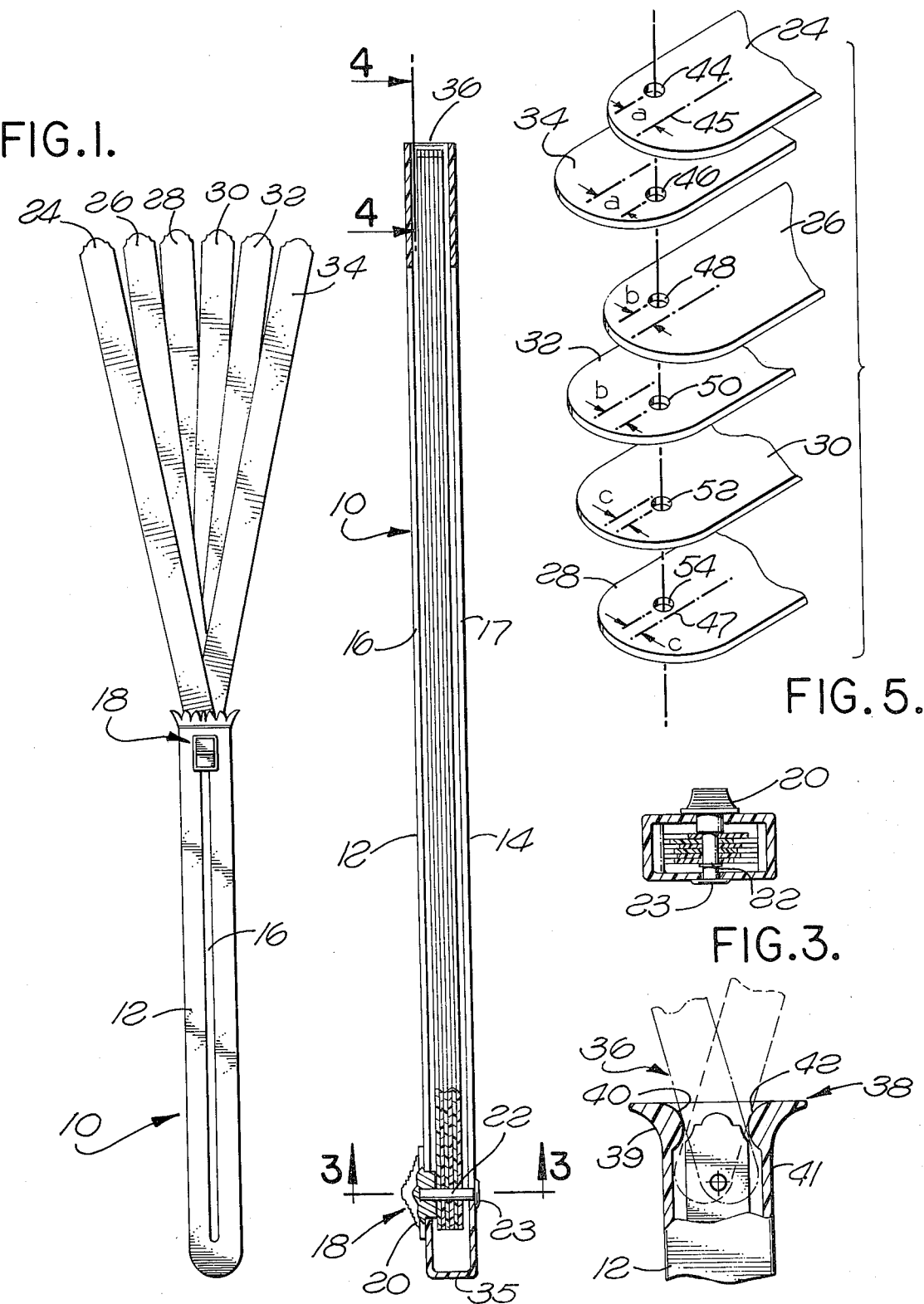

FLY SWATTER

BACKGROUND OF THE INVENTION

1. Field of the Invention

This invention relates to fly swatters and more particularly to a fly swatter having extendible-retractable striker members.

2. Description of the Prior Art

There have been a number of known extendible-retractable type fly swatters. Conventionally, these devices have taken the form of relatively long-handled members containing a rigid or flexible structure for extension or retraction. For example, U.S. Pat. No. 1,055,998 discloses a plurality of flexible strands secured together at one end by a plug positioned within a handle. Coils of wire separate the strands into a plurality of fan-like tufts as they are extended from the handle by the plug.

Another type of extendible-retractable fly swatter, disclosed in U.S. Pat. No. 3,412,501, has a conventional flexible-flap swatter having a rigid handle telescoped within a second larger rigid handle member. The fly swatter can be locked in either its extended or its retracted position by the well-known expedient of a bayonet lock means engaged by rotating and shifting the two handle members relative to one another.

As exemplified by structures referred to above, various collapsible or compactable swatters have been proposed. However, a need continues to exist for a simple, effective unit that can be economically manufactured and conveniently used. The present invention, representing an improvement over the above-mentioned devices, employs a novel and effective structure for extending and retracting strikers mounted directly within a unitary handle which houses the strikers in their entirety when retracted. In a compact form the swatter of the present invention is relatively small and easy to carry. The design and fabrication of this novel device is simple and economical, yet the operation is extremely effective.

SUMMARY OF THE INVENTION

Briefly, this invention is directed to a swatter mechanism incorporating a novel mounting of fly swatter striker members in a hollow handle thereby permitting extension and retraction of the strikers.

The handle includes guide means which in cooperation with the striker mounting means guide the strikers into a fan-like configuration as they are extended from the handle and into superimposition as they are retracted into the handle. Each striker defines a mounting hole to receive a pin which is mounted inside the handle, attached to a finger operated slide that is mounted in a slot extending longitudinally of the handle. The mounting hole in each striker is offset from the longitudinal center line of the striker and is again offset from each of the mounting holes in the other strikers. Such arrangement of the mounting holes, more fully described in the following description, provides for effective cooperation between the strikers and the guide means to achieve the desired operation.

BRIEF DESCRIPTION OF THE DRAWINGS

A better understanding of the invention may be had from a consideration of the following detailed description, taken in conjunction with the accompanying drawings, in which:

FIG. 1 is a plan view of a fly swatter constructed in accordance with the present invention with the strikers fully extended;

FIG. 2 is an enlarged, sectional side view of the fly swatter of FIG. 1, illustrated with the strikers fully retracted;

FIG. 3 is a cross-sectional view of the handle taken along the lines 3—3 of FIG. 2;

FIG. 4 is a fragmentary cross-sectional view showing the retracted free ends in solid lines and the secured ends thereof when extended in dashed lines taken along the lines 4—4 of FIG. 2;

FIG. 5 is an exploded fragmentary view showing the arrangement of the mounting holes of the strikers.

DESCRIPTION OF THE DISCLOSED EMBODIMENT

As illustrated in FIGS. 1 and 2, a fly swatter constructed in accordance with the present invention includes a hollow handle 10, open at one end 36 and closed at the other end 35 and having opposed side walls 12 and 14. The side walls 12 and 14 define parallel slots 16, 17, respectively, which extend slightly less than the length of the handle but terminate intermediate the ends thereof. A slide mechanism 18 is secured within the slots 16, 17 which function as tracks.

The mechanism 18 includes a finger-operated button 20 which is attached to a pin 22 having an enlarged head portion 23. The pin 22 is disposed between the side walls 12, 14 and in the slots 16, 17 with button 20 and head 23 disposed exteriorly of the handle. This arrangement enables the slide mechanism 18 to be securely engaged in the track means for smooth slidable movement.

Each of a plurality of superimposed strikers in the form of arms 24, 26, 28, 30, 32, 34, is pivotally mounted at one of its ends to the pin 22. When the strikers are fully retracted they are housed in superimposed relation within the handle 10 as shown in FIG. 2. These elements form the striking portion of the fly swatter and preferably are composed of a thick polyethylene plastic material of fairly high density. Six strikers were found to be the optimum number to form the swatter portion when designed with a handle approximately eight inches in length and approximately one-half inch wide.

At the open end or mouth 36 of the handle 10, guide means 38, as illustrated in FIG. 4, is provided to guide the strikers as they extend or retract past the mouth 36. The guide means 38 comprises opposing spaced-apart cam surfaces 40, 42 formed by inwardly directed protrusions 39 and 41, respectively, at the mouth 36 of the handle 10. As they extend and retract, the edges of the strikers 24–34 slide against these cam surfaces. It should be noted that the minimum lineal dimension between spaced-apart cam surfaces 40, 42 is at least equal to the width of a single striker.

The strikers are arms preferably of equal lengths, with such lengths being slightly less than the length of the handle. At a similar distance inward from one end of each striker, is a mounting hole which is offset to the left or the right of the striker's longitudinal center line. The offset distance or the position from the striker's longitudinal center line is different for each mounting hole.

The strikers are pivotally mounted by the pin 22 received in the laterally aligned mounting holes. A force applied to pin 22 along the longitudinal axis of the handle (as by upwardly manipulating the slide mechanism 18) will cause each striker to move out of the handle while laterally rotating about the cam surfaces 40 or 42 of guide means 38.

This rotation can be explained by a brief analysis of the lateral forces created on each striker during extension. Since the striker is offset, its longitudinal axis will be at an angle with respect to the longitudinal axis of the handle 10 (which is the direction of the pin's travel). As a consequence, the longitudinal force translated by the pin 22 along the axis of the handle 10, can be resolved into two force components. One component is parallel and the other is perpendicular to the longitudinal center line of the striker. The perpendicular force component, which is directed away from the mounting hole, is counteracted by a force provided at a point on the spaced-apart cam surface which is opposite the offset side of the striker and thereby producing a rotational coupling. The striker will thus tend to laterally rotate in the direction of the offset while being extended from the handle by the force component which is parallel to the longitudinal axis of the striker. It will of course be recognized that during retraction a similar analysis may be made by merely reversing the direction of the forces generated on the active cam surface or to each striker.

The degree and direction of lateral movement toward each striker will be dictated by the offset position of its associated mounting hole. For example, as illustrated in FIGS. 1 and 5, striker 24 which is caused to laterally rotate the greatest amount to the left of the longitudinal axis of the handle 10, has its mounting hole 44 offset the greatest lateral distance from its longitudinal center line 45. By the same token, striker 28 which is caused to rotate in the same lateral direction as arm 24 but of the least amount from the longitudinal axis of the handle 10, has its mounting hole 54 offset the least distance from its longitudinal center line 47. Striker 26 has its mounting hole 48 located intermediate the distances between mounting holes for the strikers 24 and 28. The affect of the lateral movement of the strikers 28, 26 and 24 as they emerge from the mouth of the handle provides a one-half fanlike structure to the left (as viewed in FIG. 1) of the longitudinal axis of the handle 10. Similarly, a corresponding but opposite offset for the mounting holes of the strikers 30, 32 and 34 result in a lateral movement of these strikers in the opposite direction as they emerge from the handle, thereby providing the one-half fanlike structure to the right of the longitudinal axis of handle 10. Thus, by staggering the offset of the mounting holes for each striker, as shown in FIGS. 3 and 5, an efficient fanlike configuration is formed as the strikers are fully extended. It should be noted that although the offset mounting holes for corresponding strikers, for example, strikers 24 and 34, are in opposite directions of the longitudinal center line of the handle 10, the fabrication for these two arms is the same. It will be seen that assembly of these two blades in the handle merely involves turning one over relative to the other so that their mounting holes are not superimposed on each other.

In operation, the handle is grasped by the user and the button 20 of the slide mechanism is pushed the entire length of the slots 16, 17. As the strikers emerge from the mouth of the handle, they tend to remain generally superimposed upon each other until the slide mechanism has moved a substantial length along its tracks. The pin 22 continues to move along the center line of the handle 10 and causes the offset mounting holes of each striker to likewise move along such center line. However, as the pin 22 (and thus the mounting holes of the strikers) approaches the opposing spaced-apart cam surfaces 40, 42, at the mouth 36 of the handle 10, the edges of the strikers move along the cam surfaces 40, 42 while, as previously mentioned, the mounting hole offset of each striker forces it to rotate about the pin 22. Thus, the strikers assume their proper position in the fan configuration of FIG. 1.

I claim:
1. A fly swatter comprising:
   a hollow handle defining a mouth and defining a first slot therethrough extending in a direction along its longitudinal axis intermediate the ends thereof;
   cam means disposed at said mouth of said handle;
   a slide means disposed in said slot;
   a plurality of arms in said hollow handle, said arms defining differently offset mounting holes with reference to a longitudinal center line of said arms laterally aligned;
   means pivotally mounting said arms to said slide means at its respective mounting hole, whereby said arms form a fan-like structure upon moving said slide means toward the mouth of said handle.

2. The invention as defined in claim 1 wherein said cam means comprises opposed surfaces through which said superimposed arms extend and retract, the distance between said surfaces being at least equal to the width of one of said arms.

3. The invention as defined in claim 1 wherein said slide means comprises a finger operated button having a portion slidably engaging said slot at one end, said pivot of mounting means projecting through said slot and being secured by said button.

4. The invention as defined in claim 1 wherein said handle defines a second slot opposed said first slot, said pivotal mounting means extending through and being guided within said slots.

5. The invention as defined in claim 4 wherein said pivotal mounting means includes a pin extending through said slots and said mounting holes and terminating in an enlarged head at one end exteriorly of said handle and at its opposite end at said slide means.

6. The invention as defined in claim 5 wherein said arms comprise flexible blades.

7. A fly swatter comprising:
   a hollow handle closed at one end and having a mouth at the other, said handle defining a pair of slots therethrough in opposing parallel relation to each other, said pair of slots extending in a direction along the longitudinal axis of said handle intermediate the ends thereof;
   a finger actuated slide mechanism mounted on said handle and containing a pin disposed therein and which projects through said pair of slots, said pin engaging a button portion on said mechanism at its one end and terminating in an enlarged head portion at its other end, said enlarged head portion and button slidably abutting said handle adjacent said pair of slots;
   a set of superimposed flexible blades in said hollow handle each of said blades in said set defining a mounting hole at one of its ends, the mounting hole for each blade in one-half of said set being offset a different distance relative to each of the mounting holes of the other blades in said one-half of said set, such offset for each of such blades in such one-half of said set being measured from one side of the longitudinal center lines for said blades, the mounting hole for each blade in the other one-half of said set being offset from the other side of the longitudinal center lines for said blades and being correspondingly measured different distances from the other side of such longitudinal center lines, each of said blades in said set being pivotably mounted to said pin by means of its respective mounting hole, such mounting being in staggered fashion resulting from the offset for all of the blades;

a guide means mounted on said handle at its mouth and including opposed spaced-apart cam surfaces;

whereby said blades pivot about said pin thereby forming a fanlike structure in the extended position from the mouth of said handle and spaced to return to their superimposed position as said pin is caused to move in the opposite direction along said slots.

* * * * *